United States Patent
Shibata et al.

(10) Patent No.: US 7,186,475 B2
(45) Date of Patent: Mar. 6, 2007

(54) UNIT CELL FOR SOLID OXIDE ELECTROLYTE TYPE FUEL CELL AND RELATED MANUFACTURING METHOD

(75) Inventors: Itaru Shibata, Kanagawa-ken (JP); Keiko Kushibiki, Kanagawa-ken (JP); Fuminori Satou, Kanagawa-ken (JP); Mitsugu Yamanaka, Kanagawa-ken (JP); Makoto Uchiyama, Kanagawa-ken (JP); Masaharu Hatano, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 173 days.

(21) Appl. No.: 10/128,307

(22) Filed: Apr. 24, 2002

(65) Prior Publication Data

US 2002/0164523 A1 Nov. 7, 2002

(30) Foreign Application Priority Data

May 1, 2001 (JP) ............................. P2001-134696

(51) Int. Cl.
*H01M 8/10* (2006.01)

(52) U.S. Cl. ............................. 429/30; 429/34; 429/38; 429/45

(58) Field of Classification Search ................. 429/30, 429/34, 38, 39, 32, 44, 45; 428/547, 548, 428/608, 613, 615
See application file for complete search history.

(56) References Cited

U.S. PATENT DOCUMENTS 5,399,442 A * 3/1995 Shundo ........................ 429/32
5,418,079 A * 5/1995 Diethelm ...................... 429/26
5,508,127 A * 4/1996 Lewin et al. .................. 429/30

FOREIGN PATENT DOCUMENTS

| GB | 2352083 | * | 1/2001 |
|---|---|---|---|
| JP | 63-106063 | | 7/1988 |
| JP | 04-092369 | | 3/1992 |
| JP | 05-326002 | | 12/1993 |
| JP | 06-223847 | | 8/1994 |
| JP | 7-45297 | | 2/1995 |
| JP | 9-50812 | | 2/1997 |
| JP | 09-050812 | | 2/1997 |
| JP | 2000-200614 | | 7/2000 |
| JP | 2000-294267 A | | 10/2000 |
| JP | 2001-35506 | | 2/2001 |

OTHER PUBLICATIONS

"Plasma Sprayed Thin-Film SOFC for Reduced Operating Temperature", Schiller et al., Deutsches Zentrum fur Luft- und Raumfahrt (DLR), Institut fur Technische Thermodynakik, pp. 596-601.

* cited by examiner

*Primary Examiner*—Raymond Alejandro
(74) *Attorney, Agent, or Firm*—McDermott Will & Emery LLP

(57) ABSTRACT

A unit cell for a solid electrolyte fuel cell is provided with an air electrode, a fuel electrode, a solid electrolyte sandwiched between the air electrode and the fuel electrode, and a porous metallic base body joined to at lease one of the air electrode and the fuel electrode. The porous metallic base body includes a plurality of porous base body layers stacked to form a laminated structure in which one layer joined to at least one of the air electrode and the fuel electrode has porosity lower than that of the other layer not joined to at least one of the air electrode and the fuel electrode.

15 Claims, 8 Drawing Sheets

FIG.6A
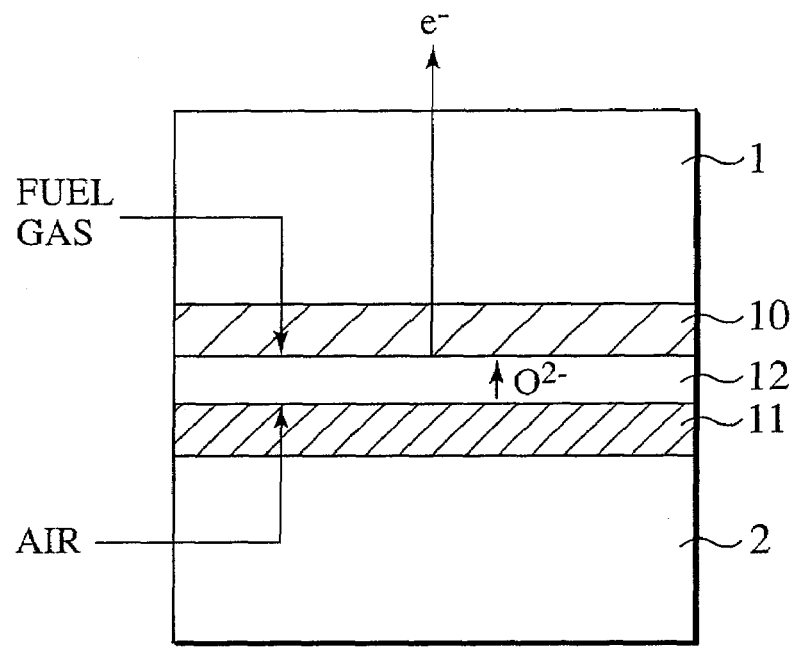
FIG.6B
FIG.7
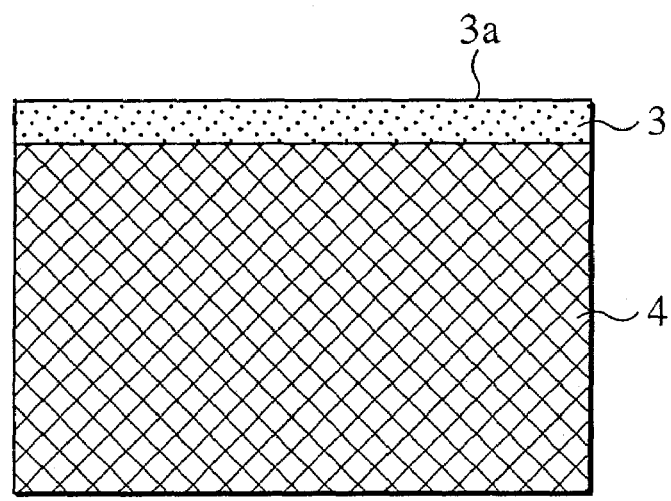

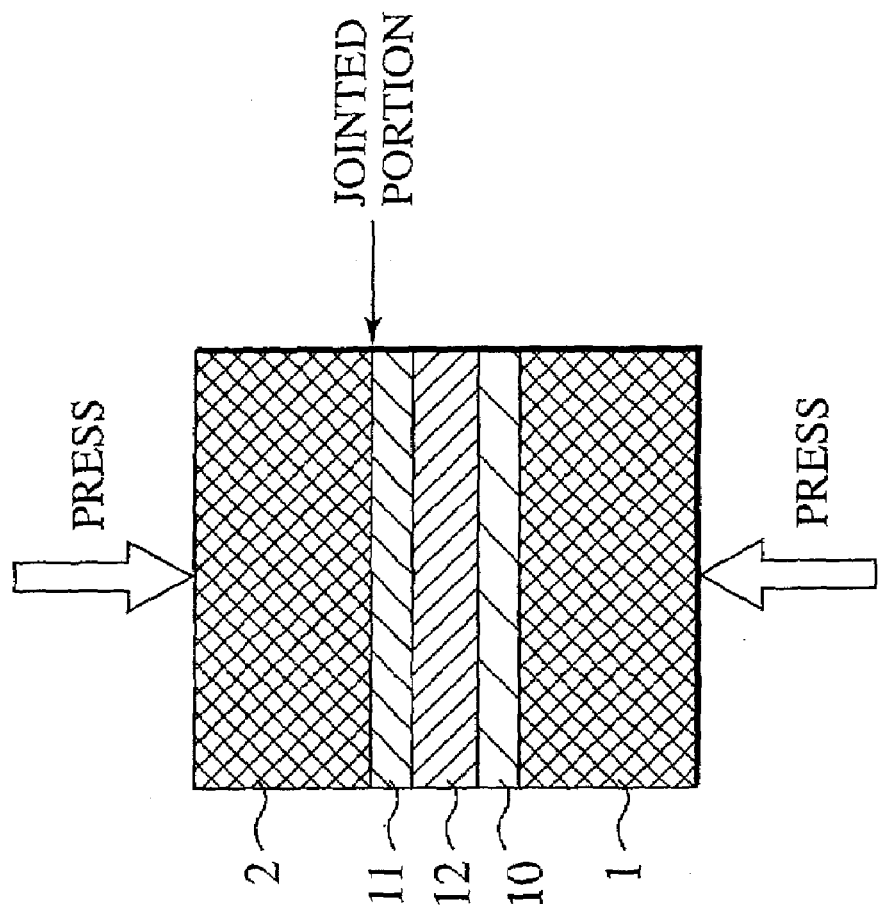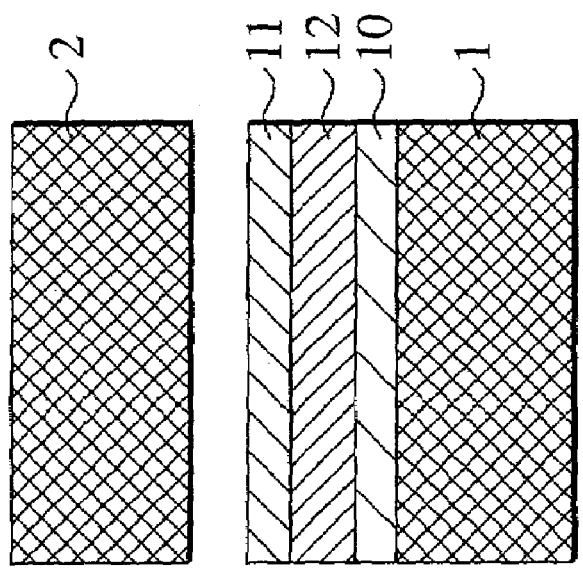

FIG.10A

| Example | Porous Base Body 1 | | Cell Component Parts | | |
|---|---|---|---|---|---|
| | 1st Surface Layer | 2nd Surface Layer | Electrode 10 | Electrode 12 | Electrode 11 |
| Example 1 | Aluminum With Ni<br>Thickness:300 μm<br>Pore Dia.:0.5 μm<br>Pore Rate:27% | Aluminum With Ni<br>Thickness:1.2mm<br>Pore Dia.:0.5mm<br>Pore Rate:60% | Ni-8%YSZ<br>Thickness:40 μm<br>Printing | 8%YSZ<br>Thickness:30 μm<br>Printing | LSC<br>Thickness:40 μm<br>Printing |
| Example 2 | Sintered Body of Metallic Grains<br>Thickness:50 μm<br>Pore Dia.:5 μm<br>Pore. Rate:50%<br>Ni-16Cr-8Fe | Sintered Body of Metallic Grains<br>Thickness:2mm<br>Pore Dia.:250 μm<br>Pore Rate:92%<br>Ni-16Cr-8Fe | Ni-8%YSZ<br>Thickness:30 μm<br>Printing | 8%YSZ<br>Thickness:10 μm<br>Sputtering | LSC<br>Thickness:20 μm<br>Printing |
| Example 3 | Sintered Body of Metallic Fibers<br>Thickness:0.5mm<br>Pore Dia.:2 μm<br>Pore Rate:30%<br>Fe-20Cr-5Al | Sintered Body of Metallic Fibers<br>Thickness:3mm<br>Pore Dia.:1mm<br>Pore Rate:70%<br>Fe-20Cr-5Al | Ni-8%YSZ<br>Thickness:30 μm<br>Printing | 8%YSZ<br>Thickness:30 μm<br>Printing | LSC<br>Thickness:40 μm<br>Printing |
| Example 4 | Sintered Body of Metallic Grains<br>Thickness:30 μm<br>Pore Dia.:2 μm<br>Pore Rate:30%<br>Ni-16Cr-8Fe | Sintered Body of Metallic Grains<br>Thickness:2mm<br>Pore Dia.:250 μm<br>Pore Rate:30%<br>Ni-16Cr-8Fe | Ni-8%YSZ<br>Thickness:30 μm<br>Printing | 8%YSZ<br>Thickness:30 μm<br>Printing | LSC<br>Thickness:40 μm<br>Printing |

FIG.10B

| Porous Base Body 2 | | Assoc. Figs. |
|---|---|---|
| 1st Surface Layer | 2nd Surface Layer | |
| Aluminum With Ag<br>Thickness:300 μm<br>Pore Dia.:1 μm<br>Pore Rate:35% | Aluminum With Ag<br>Thickness:1.2mm<br>Pore Dia.:0.8mm<br>Pore Rate:74% | Figs.5 & 8 |
| Sintered Body of Metallic Grains<br>Thickness:50 μm<br>Pore Dia.:5 μm<br>Pore Rate:50%<br>Ni-16Cr-8Fe | Sintered Body of Metallic Grains<br>Thickness:2mm<br>Pore Dia.:250 μm<br>Pore Rate:92%<br>Ni-16Cr-8Fe | Figs.5 & 8 |
| Sintered Body of Metallic Fibers<br>Thickness:0.5mm<br>Pore Dia.:2 μm<br>Pore Rate:30%<br>Fe-20Cr-5Al | Sintered Body of Metallic Fibers<br>Thickness:3mm<br>Pore Dia.:1mm<br>Pore Rate:70%<br>Fe-20Cr-5Al | Figs.5 & 9 |
| Sintered Body of Metallic Grains<br>Thickness:30 μm<br>Pore Dia.:2 μm<br>Pore Rate:30%<br>Ni-16Cr-8Fe | Sintered Body of Metallic Grains<br>Thickness:2mm<br>Pore Dia.:250 μm<br>Pore Rate:92%<br>Ni-16Cr-8Fe | Figs.5 & 9 |

UNIT CELL FOR SOLID OXIDE ELECTROLYTE TYPE FUEL CELL AND RELATED MANUFACTURING METHOD

BACKGROUND OF THE INVENTION

The present invention relates to a unit cell for solid electrolyte type fuel cell and a related manufacturing method and, more particularly, to a unit cell for a solid electrolyte type fuel cell with a structure wherein a solid electrolyte is sandwiched between a pair of electrodes, and a related manufacturing method.

In recent years, it has heretofore been proposed to provide a solid electrolyte type fuel cell (hereinafter referred to as SOFC) which is comprised of electric power generating component parts which are configured in a structure wherein a solid oxide electrolyte is sandwiched between two electrodes, i.e. between the a fuel electrode (anode) and an air electrode (cathode) to which hydrogen gas or hydrocarbon gas, such as methane, and oxidizing gas, such as oxygen and air, are supplied, respectively, to produce electric power output. It is to be noted that the component parts such as the fuel electrode, the electrolyte and the air electrode are hereinafter suitably referred to as electric power generating component parts.

Such a SOFC has a high electric power generating efficiency while enabling waste heat to be recaptured and is so highly expected as a third-generation fuel cell.

One of cell structures of such a SOFC involves an electrolyte supporting type cell shown in FIG. 1.

In FIG. 1, an elaborate electrolyte body 12 is prepared by sintering electrolyte material powder at a high density, with upper and lower surfaces thereof being covered with an air electrode 11 and a fuel electrode 10 that are formed by screen printing. Also, in such a cell, the electrolyte body 12 is used as a supporting member.

Further, Japanese Patent Application Laid-Open Publication No. H9-50812 discloses a porous electrode substrate formed of a sintered body of ceramic electrode material powder with pore rates different in a direction along the thickness of the sintered body.

Also, Japanese Patent Application Laid-Open Publication No. 2000-200614 discloses a porous electrode substrate formed of a sintered body of ceramic material powder.

In addition, it has been proposed to provide a cell formed of a porous metallic substrate 1, that serves as a supporting member of electric power generating component parts, i.e. a fuel electrode 10, an electrolyte 12 and an air electrode 11, as shown in FIG. 3, which are formed on the substrate by thermal spraying.

Further, a so-called DLR cell (Plasma Sprayed thin-Film SOFC for reduced Operating Temperature, Fuel Cells Bulletin, pp 597–600, 2000) has also been proposed.

Further, Japanese Patent Application Laid-Open publication No. H7-45297 and Japanese Utility Model Application Laid-Open Publication No. S63-106063 disclose a SOFC which employs a current collecting member such as a Ni-felt separately of electrodes for collecting electric power output produced across a fuel electrode and an air electrode.

Furthermore, it is a usual practice for such SOFC to be utilized under a circumstance wherein multiple cell components are electrically connected in wither series or in parallel and, therefore, it is required to provide a connecting member (hereinafter referred to as I. C. (an interconnector)) for providing electrical connections among respective cell component parts. There are some instances where such I. C. has a current collecting function.

In addition, since the SOFC is so arranged as to allow hydrogen or hydrocarbon fuel gas such as methane to be supplied to the fuel electrode and oxygen or oxidizing gas such as air to be supplied to the air electrode for thereby generating electric power output, there is a need for preparing a member that forms a gas flow passage for introducing gas to the electrode surfaces. There are some instances where the member for forming the gas flow passage has the I. C. function.

SUMMARY OF THE INVENTION

However, according to various studies conducted by inventors of the present Patent application, since the electrolyte supporting type cell shown in FIG. 1 employs the electrolyte as the supporting member for the electric power generating component parts, it is required for the electrolyte to have a thickness of a value ranging from approximately several hundreds μm to several values mm, tending to increase internal resistance of the electrolyte portion.

With the electrode supporting type cell shown in FIG. 2, further, since the electrodes are used as the supporting member of the electric power generating component parts, it is required for the electrode bodies to have a thickness greater than approximately several mm because of a required mechanical strength, tending to increase internal resistances of electrode portions while deteriorating permeability and diffusion property of fuel gas or oxidizing gas.

Furthermore, the porous ceramic electrode substrate with improved permeability, disclosed in Japanese Patent Application Laid-Open Publication No. H9-50812 and Japanese Patent Application Laid-Open Publication No. 2000-200614, encounters a difficulty in obtaining an adequate electric conductivity resulting in a tendency of having a brittleness peculiar to the ceramic material.

Also, there is a need for the I. C. and gas flow passage members to be separately located from the cells shown in FIGS. 1 and 2, with a resultant tendency of causing an obstruction to miniaturization of the SOFC.

Further, with the cell shown in FIG. 3, there are tendencies wherein (a) the use of the thermal-spraying film forming step causes the thickness values of the respective films of the electrodes and the electrolyte to lie in large values of several tens μm to provide a difficulty in sufficiently reducing internal resistance, (b) the presence of coarse surfaces of the porous metallic body disenables the electrode and the electrolyte to be formed in thinned films such that the internal resistance is not sufficiently reduced, (c) the use of the plate having a concave-shaped cross section, without using the porous metallic body as the gas flow passage for the fuel electrode located at the lower area of the cell, causes an insufficient ability of providing a miniaturization of the cell, and (d) the use of the plate 15 with a waved cross section without using the porous metallic body as the gas flow passage for the air electrode located above the cell causes an insufficient ability of providing a miniaturization of the cell.

The present invention has been completed upon considerable diligent studying work in an effort to address the above issues and has an object of the present invention to provide a unit cell for a solid electrolyte type fuel cell and a related manufacturing method wherein electrodes (an air electrode and a fuel electrode) and an electrolyte are formed in thin films to reduce internal resistances while achieving a miniaturization.

That is, the present invention has been completed in a success based on a new knowledge wherein the above issues can be solved through the use of a porous metallic base body with a desired strength to compel it to serve as a supporting base body for cell component parts, with the porous metallic base body contemplating to have a current collecting function for cell output and to have a gas flow passage function.

According to the present invention, a cell unit for a solid electrolyte type fuel cell comprises an air electrode, a fuel electrode, a solid electrolyte sandwiched between the air electrode and the fuel electrode, and a porous metallic base body joined to at lease one of the sir electrode and the fuel electrode to form a sandwiched body. The porous metallic base body allows oxidizing gas, to be supplied to the air electrode, and fuel gas, to be supplied to the fuel electrode, to flow therethrough while allowing a cell power output to be collected from reacting areas provided by the sandwiched body composed of the air electrode, the fuel electrode and the solid electrolyte.

In other words, a cell unit for a solid electrolyte type fuel cell, according to the present invention, comprises an air electrode, a fuel electrode, a solid electrolyte sandwiched between the air electrode and the fuel electrode, and joining means joined to at least one of the air electrode and the fuel electrode. The joining means allows oxidizing gas, to be supplied to the air electrode, and fuel gas, to be supplied to the fuel electrode, to flow therethrough while allowing a cell power output to be collected from reacting areas provided by the sandwiched body composed of the air electrode, the fuel electrode and the solid electrolyte.

On one hand, a method of manufacturing a cell unit for a solid electrolyte type fuel cell, according to one of methods of the present invention, comprises forming a first layer, that corresponds to one of an air electrode and a fuel electrode, on a first porous metallic base body, forming a second layer, composed of a solid electrolyte, on the first layer, forming a third layer, that corresponds to the other one of the fuel electrode and the air electrode, on the second layer, and joining a second porous metallic base body onto the third layer.

A method of manufacturing a cell unit for a solid electrolyte type fuel cell, according to another one of methods of the present invention, comprises forming a first layer, that corresponds to one of an air electrode and a fuel electrode, on a first porous metallic base body, forming a second layer, composed of a solid electrolyte, on the first layer, forming a third layer, that corresponds to the other one of the fuel electrode and the air electrode, on a second porous metallic base body, and joining the first and second porous metallic base bodies such that the second layer is sandwiched between the first and third layers.

Other and further features, advantages, and benefits of the present invention will become more apparent from the following description taken in conjunction with the following drawings.

BRIEF DESCRIPTION OF THE DRAWINGS

FIG. 6A is a schematic cross sectional view illustrating an operating principle of the unit cell for the fuel cell of the preferred embodiment shown in FIG. 5, and FIG. 6B is a circuit diagram illustrating an equivalent circuit of FIG. 6A;

FIG. 7 is a schematic cross sectional view of showing a more detailed structure of a porous metallic base body of the unit cell for the fuel cell of the preferred embodiment according to the present invention;

FIGS. 8A and 8B are schematic views illustrating a manufacturing method of the unit cell for the fuel cell of the preferred embodiment according to the present invention;

FIGS. 10A and 10B is a table illustrating various examples carried out through the use of various materials for the porous metallic base bodies and the cell component parts with variations in a film thickness, a pore diameter and a pore rate, etc. ,of the preferred embodiment according to the present invention.

DETAILED DESCRIPTION OF THE PREFERRED EMBODIMENT

To describe the present invention in more detail, a preferred embodiment of a unit cell for a SOFC and a related manufacturing method according to the present invention will be described with reference to the drawings. Also, a reference symbol "%" refers to a percentage by way of a mass unless other specific mention is made.

Further, for the sake of convenience of illustration, while one surface of a substrate or an electrode is referred to as "a surface" and "an upper surface" whereas the other surface is referred to as "a rear surface" and "a lower surface", it is to be noted that the "surface", "upper surface", "rear surface" and "lower surface" have an equivalent meaning and that component elements mutually substituted one another principally have the equivalent meaning.

The solid oxide electrolyte type unit cell (hereinafter suitably referred to as a unit cell) of the presently filed preferred embodiment is comprised of a sandwiched structure of a solid electrolyte sandwiched between an air electrode and a fuel electrode, with the sandwiched structure having a surface and/or rear surface mounted with a porous metallic base body.

Figure 4:
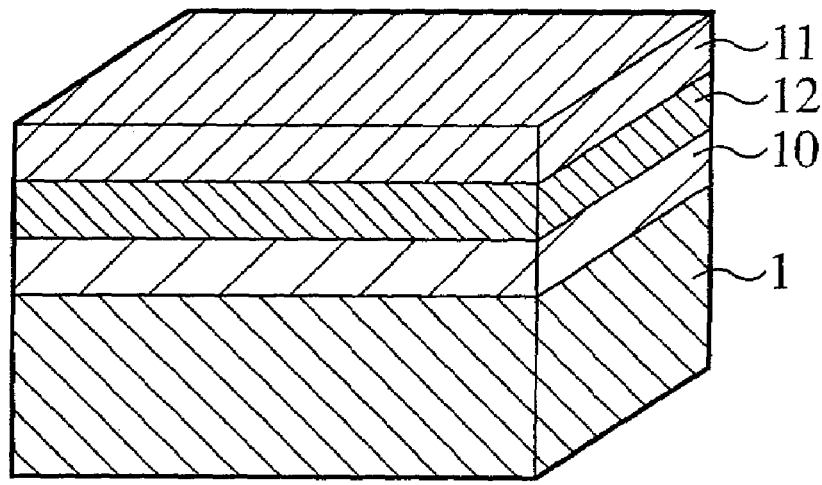
FIG. 4 is a schematic perspective view illustrating a unit cell for a fuel cell of a preferred embodiment according to the present invention.

In particular, as shown in FIG. 4, such a unit cell includes a structure wherein the one surface of such sandwiched structure is covered with the porous metallic base body 1, i.e. wherein the porous metallic base body 1, the fuel electrode 10, the solid electrolyte 12 and the air electrode 11 are stacked in a sequence. Also, such a structure is principally equivalent to a structure wherein the porous metallic base body 1, the air electrode 11, the solid electrolyte 12 and the fuel electrode 10 are stacked in a sequence. Also, forming a fuel cell stack by stacking the unit cells of such a structure allows the sandwiched structures to be sequentially sandwiched between the porous metallic base bodies 1 in a stack.

Figure 5:
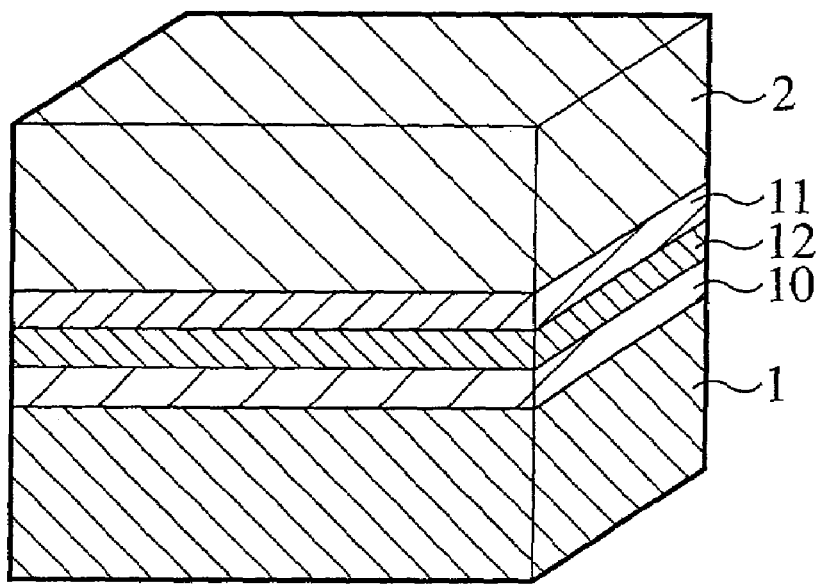
FIG. 5 is a schematic perspective view illustrating another unit cell for a fuel cell of the preferred embodiment according to the present invention.

Subsequently, as shown in FIG. 5, the unit cell has a structure wherein the both surfaces of the sandwiched structure are covered with the porous metallic base bodies 1 and 2, i.e. a structure wherein the porous metallic base body 1, the fuel electrode 10, the solid electrolyte 12, the air electrode 11 and the porous metallic base body 2 are stacked in a sequence. Also, such a structure is principally equivalent to the structure wherein the porous metallic base body 1, the air electrode 11, the solid electrolyte 12, the fuel electrode 10 and the porous metallic base body 2 are stacked in a sequence.

And, with the unit cell of the structure previously noted above, the porous metallic base body 1 or the porous metallic base bodies 1 and 2 serve to pass the flows of fuel gas and/or oxidizing gas for thereby collecting cell outputs from reacting areas associated with the sandwiched structure.

Referring to the unit cell structure shown in FIG. 5 to describe more in detail for the convenience's sake, using the porous metallic base bodies 1 and 2, which have a gas permeability and dispersing property, as supporting substrates 1 and 2 as shown in FIGS. 6A and 6B, allows the fuel electrode 10, held in tight contact with such porous metallic base body 1, to be supplied with fuel gas while allowing the air electrode 11, held in tight contact with such porous metallic base body 2, to be supplied with air in a highly reliable manner. That is, since the porous metallic base bodies 1 and 2 which form component parts of the unit cell of the presently filed preferred embodiment play as both supporting bodies and gas flow passages, it is possible for all of the solid electrolyte 12, the air electrode 11 and the fuel electrode 10 to be formed in respective thin layers to reduce the volume of an internal structure of the unit cell.

Figure 1:
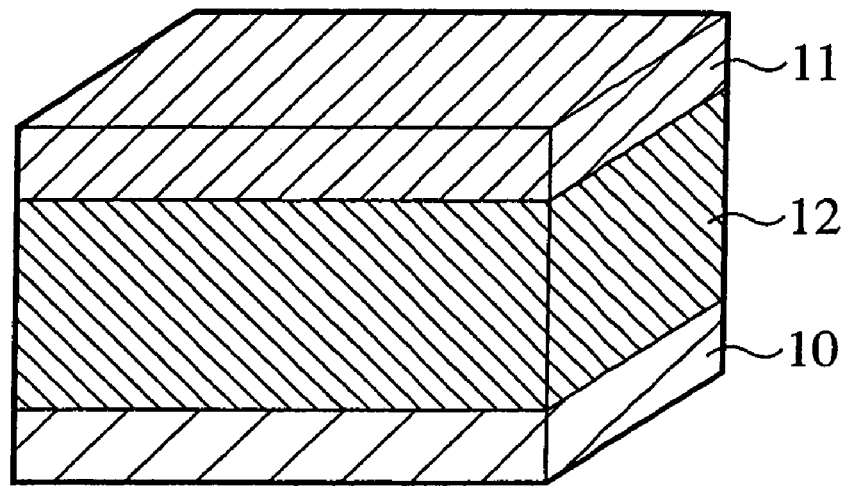
FIG. 1 is a schematic perspective view illustrating a unit cell for a fuel cell of an electrolyte supporting type which the present inventors have been studied.
Figure 2:
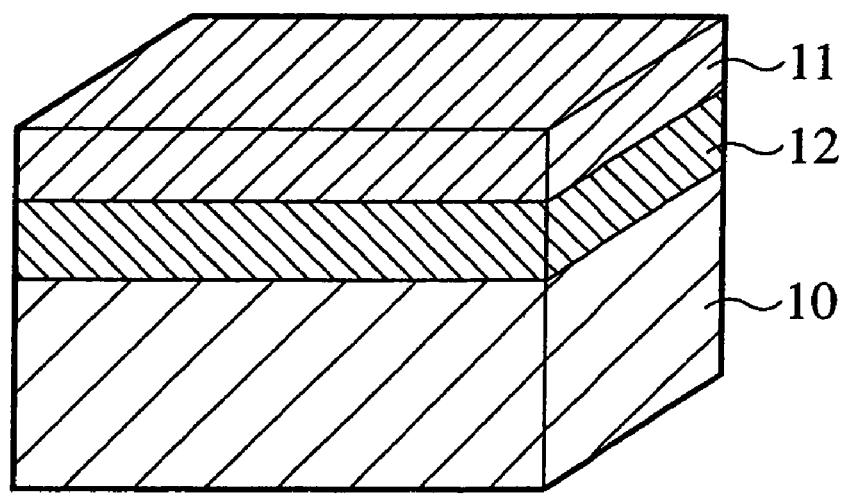
FIG. 2 is a schematic perspective view illustrating another unit cell for a fuel cell of an electrode supporting type which the present inventors have been studied.
Figure 3:
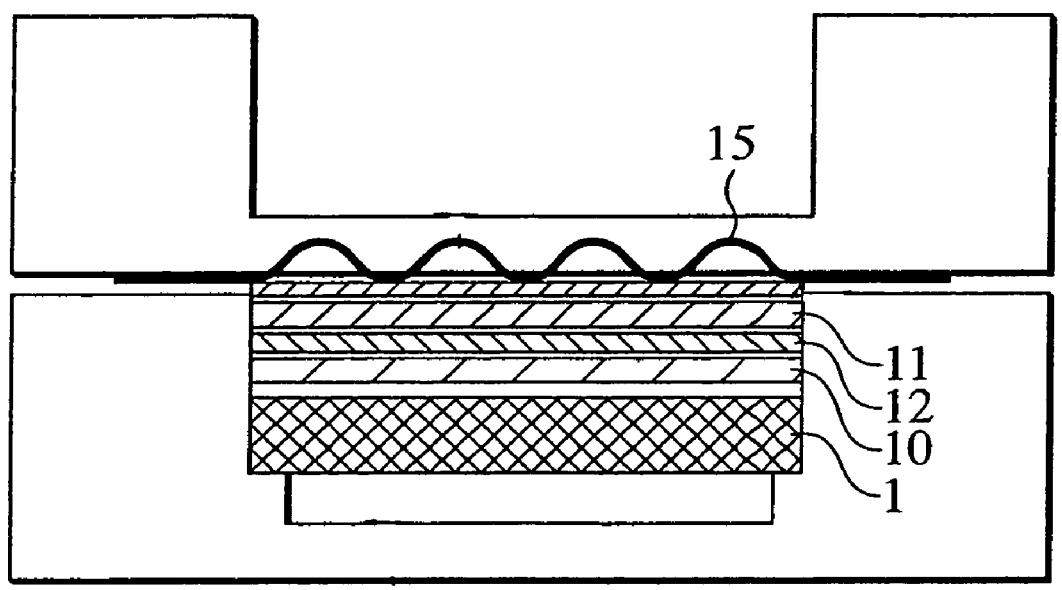
FIG. 3 is a schematic cross sectional view illustrating a unit cell structure of a fuel cell using a porous metallic base body which the present inventors have been studied.

Further, in the unit cells of the related art practices shown in FIGS. 1 and 2, while, when the unit cell of a thinned structure is formed with the solid electrolyte, the fuel electrode and the air electrode which are formed in thinned layers, such a solid electrolyte, an air electrode and a fuel electrode, i.e. cell components per se have an inability of self-supporting characteristic, the unit cell of the preferred embodiment is provided with the supporting substrates which support the cell components to enable the cell components of the thinned structures to be reliably supported.

Furthermore, in the preferred embodiment, it is desirable for the porous metallic base body to have electric conductivity, with such characteristic permitting cell outputs to be collected from the reacting areas formed by the sandwiched structure. That is, such a porous metallic base body also serves as a current collecting member, resulting in the SOFC of a miniaturized configuration formed of the unit cell of such a structure.

In the preferred embodiment, further, the porous metallic base body is preferably made of nickel (Ni), nickel chrome (Ni—Cr), nickel-chrome iron (Ni—Cr—Fe), nickel-chrome-tungsten molybdenum (Ni—Cr—W—Mo), nickel cobalt (Ni—Co), nickel copper (NI—Cu), silver (Ag), silver palladium (Ag—Pr). silver platinum (Ag—Pt), iron-chrome nickel (Fe—Cr—Ni) or iron-chrome aluminum (Fe—Cr—Al), or an alloy composed of an arbitrary combination of these metals. More preferably, the porous metallic base body may be made of nickel copper or silver palladium. Further, it may be possible for the porous metallic base body to be made of a ceramic which is plated with the above metals or with the alloy containing the above metals.

And, the use of the metallic materials of the kind described above allows the porous metallic base body to have a sufficient durability for a practical use with respect to a reducing atmosphere or an oxidizing atmosphere presented by fuel gas or oxidizing gas or an oxidizing atmosphere. For example, with the SOFC manufactured using the unit cell of the present invention, while hydrocarbon gases such as methanol, natural gas and gasoline may be used as fuels, the porous metallic base body mounted to the fuel electrode side is hard to be attacked by sulfur contained in fuel gas. Further, the SOFC manufactured using the unit cell of the present invention allows oxygen gas or air to be used as oxidizing gas and, in this instance, the porous metallic base body mounted to the air electrode side is hard to be oxidized in oxidizing gas.

Moreover, the porous metallic base body may have a thickness in a value ranging from 0.5 to 5 mm. With the thickness settled in such a range, the porous metallic base body is able to ensure electric conductivity as I. C. (an interconnector) and gas permeability and dispersing property as the gas flow passage. This is due to the fact in that, with the porous metallic base body having the thickness in a range below 0.5 mm, it has an insufficient strength as the supporting element whereas, with the porous metallic base body with the thickness in a range greater than 5 mm, the supporting element undergoes an increased thermal distortion.

In addition, it is preferable for the porous metallic base body to be formed of a laminated body that includes more than two layers of porous base body layers of the same kinds having different porosity rates or of the different kinds. With such construction, it is possible for the low porosity rate layer (the surface layer) to exhibit a function (herein after referred to as a film forming function) enabling the electrode and the solid electrolyte to be formed in thin films in order, a current collecting function for collecting electric current from the electrodes and an I. C. function and for the other layers than the surface layer to exhibit a surface-layer supporting function, a gas-flow passage function and an I. C. function in assigned relationships, respectively. For example, as shown in FIG. 7, the porous metallic base body may take the form of a laminated structure that includes a first surface layer 3, having an electrode forming layer 3a adapted to be held in contact with an associated electrode, and a second surface layer 4 with its porosity rate different from that of the first surface layer 3, i.e., for example, with a higher porosity layer than that of the first surface layer 3. Here, the porous metallic base body layer covered with the air electrode and/or the fuel electrode is referred to as the "first surface layer" and the porous metallic base body layer which is not covered with the air electrode and/or the fuel electrode is referred to as the "second surface layer" which is meant by "a surface layer other than the first surface layer".

Further, the porous metallic base body is enabled to be located in tight contact with entire surfaces of the fuel electrode and the air electrodes among the components elements of the thin-filmed cell, providing a capability of satisfactorily supporting the thin-filmed cell components while providing desired current collecting capability. Also, in a case where the porous metallic base body, which should form the respective layers of the laminated structure of the unit cell of the present invention, or the porous metallic base body per se are formed of the laminated structures, the respective layers of each laminated structure may be formed of the same kinds or of the different kinds and may be suitably selected from the metallic materials discussed above.

In addition, it is preferred for the laminated body, which forms the porous metallic base body configured in the laminated structure, to have the first and second surface layers separately formed from one another so as to enable control of the film thickness, the pore size and the pore rate, etc., provided that, in such laminates body, forming the unit cell in a structure wherein the electrodes (the air electrode and/or the fuel electrode) are covered with the second surface layer is not objectionable.

In particular, it is preferable for the porous metallic base body to have the first surface layer of a thickness ranging from 50 to 500 μm. With such an instance, it is possible for the porous metallic base body to exhibit the film forming function, the current collecting function and the I. C. function in a more effective manner. In this respect, if the first surface layer has a thickness less than 50 μm, it becomes difficult for the first surface layer per se to play as a filmed substrate applied with a physical vapor deposition process (PVD process), a chemical vapor deposition process (CVD process), a screen printing process, a spray coating process, a plating process, an electrophoresis process and a sol-gel process. Further, the first surface layer per se encounters a difficulty to be formed in a self-sustaining continuous body, resulting in a degraded current collecting function, an increased electrical resistance and a degraded I. C. function. On the contrary, if the first surface layer has a thickness greater than 500 μm, the first surface layer provides a restriction in flow of gas for thereby causing a difficulty in supplying sufficient amounts of fuel gas and oxidizing gas to the fuel electrode and the air electrode, respectively.

Further, it is preferred for such a first surface layer to have pores with a diameter equal to or less than 50 μm. As such, it is possible for fuel gas and oxidizing gas to be supplied to the fuel electrode and the air electrode, respectively, at respective sufficient amounts while enabling the film forming function to be exhibited. Also, if the pores are coarse to have a diameter greater than 50 μm, it becomes difficult for the first surface layer per se to play as a filmed substrate applied with a PVD process, a CVD process, a screen printing process, a spray coating process, a plating process, an electrophoresis process and a sol-gel process, providing a difficulty to continuously form the electrode layer and subsequently the electrolyte layer. Furthermore, the pore aidmeter has a lower limit that is a substantially determined lower limit that compels the porosity to serve as an effective porosity.

Further, it is preferred for such a first surface layer to have a pore rate of a value equal to or greater than 20%. As such, it is possible for fuel gas and oxidizing gas to be supplied at sufficient flow rates to the fuel electrode and the air electrode, respectively. In contrast, with the first surface layer having the pore rate less than 20%, the first surface layer has inadequate surface areas to provide an increased restriction in the flow of gas, with a resultant difficulty caused in supplying fuel gas and oxidizing gas to the fuel electrode and the air electrode, respectively, at sufficient flow rates. Also, although the pore rate may of course has an upper limit of a value less than 100%, the upper limit may be determined in a balance of the flow rate of gas to be supplied and the strength of the layer, etc.

Furthermore, it is desired for such a first surface layer to be formed of a sintered body of metallic fibers, a sintered body of metallic fine-grains and a metal mesh.

In addition, it is preferred for the second surface layer of the porous metallic base body to have a thickness of a value equal to or greater than 100 μm. As such, the second surface layer is enabled to exhibit the surface layer supporting function, the gas flow passage function and the I. C. function. Further, with the second surface layer having a thickness less than 100 m, it is hard to have an adequate rigidity for supporting the surface layer and an increased pressure loss is caused in the gas flow passage. Furthermore, electrical resistance is increased, with a resultant degraded I. C. function. In this connection, an upper limit of such a thickness is suitably determined depending on limits in the size of the unit cell.

Further, it is preferred for such a second surface layer to have porosities with a diameter of a value ranging from 100 to 1000 μm. As such, the gas flow passage may have a reduced pressure loss while providing a capability of supporting the surface layer. Also, Also, if the pore has a diameter less than 100 μm, an increased resistance is caused in the flow of gas and, if the pore has a diameter greater than 1000 μm, a difficulty is encountered in supporting the surface layer.

Furthermore, it is preferred for such a second surface layer to have a pore rate of a value equal to or greater than 60%. As such, it is possible to obtain a decreased pressure loss in the gas flow passage.

Also, it is desired for such a second surface layer to be formed of a sintered body of metallic fibers, a sintered body of fine grains (involving a plated sintered body) and a metallic screen body having small apertures.

In the preferred embodiment, further, the use of porous metallic base body allows the thin film type unit cell, which is able to compel the same to have a current collecting capability in a thickness direction of the film to be formed.

More particularly, the air electrode and/or the fuel electrode which the porous metallic base body covers, in other word, the electrode, among the air electrode and the fuel electrode with which the porous metallic base body is held in contact, is able to have a thickness of a value ranging from 1 to 50 μm. With such a feature, the unit cell of the present invention is able to have a thickness of a value equal to or less than 1/20 times the thickness of the electrolyte supporting type cell shown in FIG. 1, resulting in a decreased internal electric resistance of the electrolyte portion lying in a value of 1/20 times that of the same.

Further, such an electrode and an electrolyte may be covered with the use of various film forming methods such as a PVD process, a CVD process, a thermal spraying process, a screen printing process, a spray-coating process, a plating process, an electrophoresis process and a sol-gel process.

Now, a detailed description is given to a manufacturing method for the SOFC unit cell of the preferred embodiment according to the present invention.

Such a manufacturing method comprises the steps of forming a first layer, that corresponds to one of an air electrode and a fuel electrode, on a first porous metallic base body to cover the same, forming a second layer, composed of an electrolyte, on the first layer to cover the same, forming a third layer, that corresponds to the other one of the air electrode and the fuel electrode, on the second layer to cover the same and jointing a second porous metallic base body onto the third layer in a sequence. That is, the laminated body composed of the first porous metallic base body, the first layer which forms the one of the electrodes, the second layer which forms the electrolyte and the third layer which forms the other one of the electrodes, and the second porous metallic base body are mutually brought into pressured contact and joined to one another while being heated, thereby obtaining the SOFC unit cell of the preferred embodiment according to the present invention.

As shown in FIG. 8A, the manufacturing method to perform such a joining step is initially carried out by placing the electrode 10, the solid electrolyte 12 and the electrode 11 onto the porous metallic base body 1 in a sequence and subsequently locating the porous metallic base body 2 on the electrode 11 at the side of the first surface layer of the porous metallic base body 1 whereupon, as seen in FIG. 8B, these component parts are pressurized while being heated to join the porous metallic base bodies 1 and 2 with respect to one another by means of the electrode 11.

An alternative manufacturing method of the preferred embodiment comprises the steps of forming a first layer, that corresponds to one of an air electrode and a fuel electrode, on a first porous metallic base body to cover the same, forming a second layer, composed of an electrolyte, on the first layer to cover the same, forming a third layer, that corresponds to the other one of the air electrode and the fuel electrode, on the second layer to cover the same, and jointing the first and second porous metallic base bodies with respect to one another such that the second layer is sandwiched between the first and third layers, with these steps being implemented in a sequence. That is, the laminated body composed of the first porous metallic base body, the first layer which forms the one of the electrodes and the second layer which forms the electrolyte, and the laminated body composed of the third layer, which is the other one of the electrodes, and the second porous metallic base body are mutually brought into pressured contact and joined to one another while being heated, thereby obtaining the SOFC unit cell of the preferred embodiment according to the present invention.

Figure 9B:
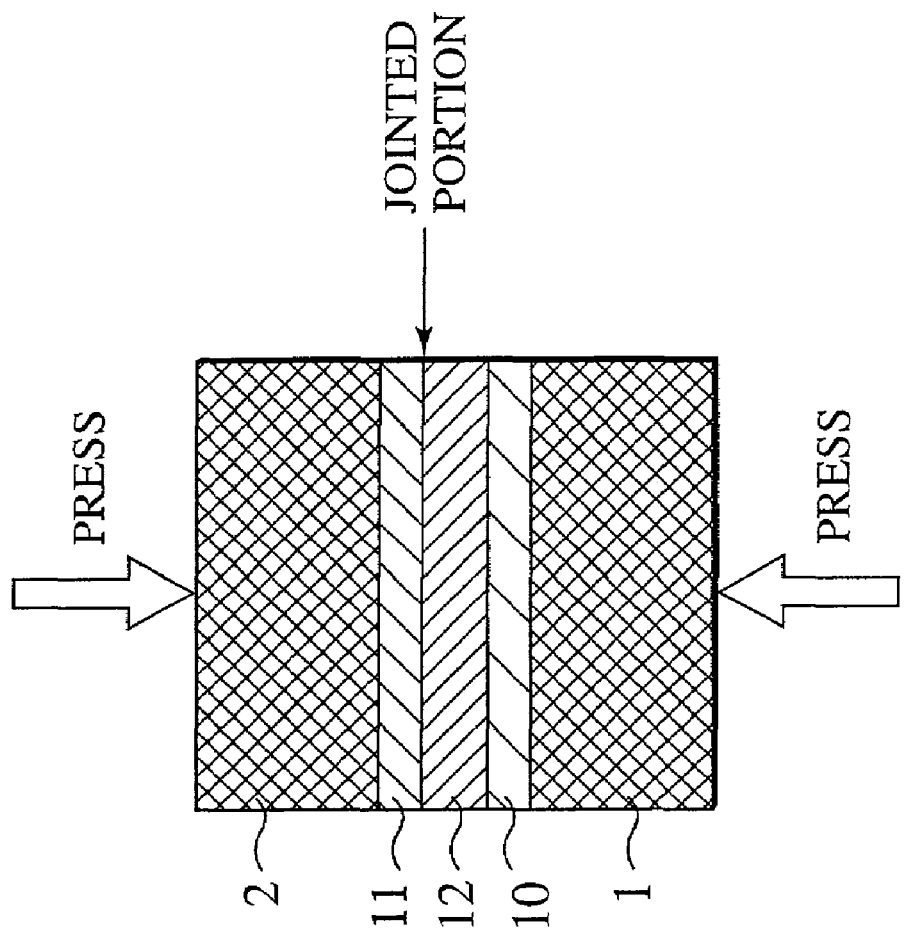
FIGS. 9A and 9B are schematic views illustrating another manufacturing method of the unit cell for the fuel cell of the preferred embodiment according to the present invention.
Figure 9A:
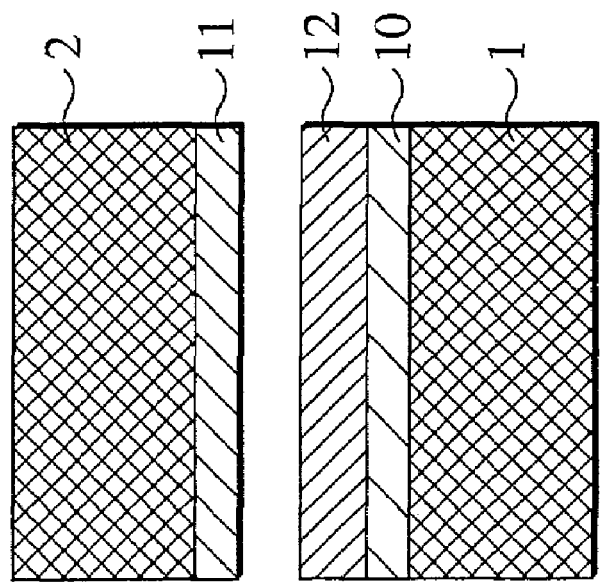

As shown in FIG. 9A, the alternative manufacturing method to perform such a joining step is initially carried out by placing the electrode 10 and the solid electrolyte 12 on the porous metallic base body 1 in a sequence while covering the porous metallic base body 2 with the electrode 11 whereupon the porous metallic base bodies 1 and 2 are located with respect to one another such that the solid electrolyte 12 and the electrode 11 is opposed to one another and, subsequently, as seen in FIG. 9B, these component parts are pressurized while being heated to join the porous metallic base bodies 1 and 2 with respect to one another by means of the solid electrolyte 12.

In the manufacturing methods described above, further, in order to have a desired joining strength, the heating temperature may be preferably maintained at a temperature ranging from approximately 800 to 1200° C. and the pressure may be preferably maintained at a level ranging from approximately 5 to 10 Pa. Also, the electrode and the electrolyte may be preferably covered with the use of various film forming methods such as, typically, a PVD process, a CVD process, a screen printing process, a spray-coating process, a plating process, an electrophoresis process and a sol-gel process.

Now, the present invention is described below in detail with reference to typical examples.

EXAMPLE 1

In this EXAMPLE 1, a SOFC unit cell was prepared to have a structure that included the porous base body 1 and the battery components (the electrode 10, the solid electrolyte 12 and the electrode 11) shown in EXAMPLE 1 of FIGS. 10A and 10B.

In particular, as shown in FIGS. 8A and 8B, the porous base body 1, which includes a ceramic (alumina) body plated with Ni, is coated with the electrode 10 (Ni-8% YSZ), the solid electrolyte 12 (8% YSZ) and the electrode 11 (LSC) in a sequence using the screen printing process, with the porous base body 2, which includes a ceramic body plated with Ag, being placed on the electrode 11 and heated at the temperature of 850° C. and pressed under a pressure 10 Pa thereby obtaining the SOFC unit cell as shown in FIG. 5. Also, the porous base body 1 had the first and second surface layers which were different from one another in thickness, the pore diameter and the pore rate, while the porous base body 2 also had the first and second surface layers which were different from one another in thickness, the porous diameter and the porous rate.

Such a SOFC unit cell had an electric power generating characteristic and durability for an adequate practical use.

EXAMPLE 2

In this EXAMPLE 2, a SOFC unit cell was prepared to have a structure that included the porous base body 1 and the battery components (the electrode 10, the solid electrolyte 12 and the electrode 11) shown in EXAMPLE 2 of FIGS. 10A and 10B.

In particular, this Example 2, the SOFC was prepared in the same process as that of the Example 1 and had the same structure as that of the Example 1 except for a slight alteration in that the sintered bodies of metallic fine grains (Ni-16Cr-8Fe) were used as the porous base bodies 1 and 2 and the solid electrolytes were coated over these components by sputtering such that the thickness, the pore diameters and the pore rates of the porous base bodies 1 and 2 and the thickness of the battery components 10 to 12 were altered.

Such a SOFC unit cell also had an electric power generating characteristic and durability for an adequate practical use.

EXAMPLE 3

In this EXAMPLE 3, a SOFC unit cell was prepared to have a structure that included the porous base body 1 and the battery components (the electrode 10, the solid electrolyte 12 and the electrode 11) shown in EXAMPLE 3 of FIGS. 10A and 10B.

In particular, as shown in FIGS. 9A and 9B, the porous base body 1, which includes a metallic fiber sintered body (composed of a sheet of Fe-20Cr-5Al), is coated with the electrode 10 (Ni-8% YSZ) and the solid electrolyte 12 (8% YSZ) in a sequence using the screen printing process, while on the other hand, the porous base body 2 (composed of the metallic fiber body (the sheet of Fe-20Cr-5Al) was coated with the electrode 11 (LSC) by screen printing whereupon the porous base bodies 1 and 2 were heated at the temperature of 850° C. and pressed with respect to one another under a pressure 10 Pa such that the solid electrolyte 12 and the electrode 11 were opposed to one another thereby obtaining the SOFC unit cell as shown in FIG. 5. Also, The porous base body 1 had the first and second surface layers which were different from one another in thickness, the pore diameter and the pore rate, while the porous base body 2 also had the first and second surface layers which were different from one another in thickness, the porous diameter and the porous rate.

Such a SOFC unit cell had an electric power generating characteristic and durability for an adequate practical use.

EXAMPLE 4

In this EXAMPLE 4, a SOFC unit cell was prepared to have a structure that included the porous base body 1 and the battery components (the electrode 10, the solid electrolyte 12 and the electrode 11) shown in EXAMPLE 4 of FIGS. 10A and 10B.

In particular, this Example 2, the SOFC was prepared in the same process as that of the Example 3 and had the same structure as that of the Example 3 except for a slight alteration in that the sintered bodies of metallic fine grains (Ni-16Cr-8Fe) were used as the porous base bodies 1 and 2 and the thickness, the pore diameters and the pore rates of the porous base bodies 1 and 2 and the thickness of the battery components 10 to 12 were altered.

Such a SOFC unit cell also had an electric power generating characteristic and durability for an adequate practical use.

While the present invention has been previously described in detail with reference to the preferred embodiment and the various examples, the present invention is not limited thereto and it will be appreciated to those skilled in the art that various other various modifications and alternatives to those details could be developed in light of overall teachings of the disclosure.

For example, the shapes and numbers of the unit cells and the component parts may be arbitrarily selected to provide a fuel cell desired for an intended power output capacity. Also, the suitable combination between the porous metallic base body and the insulating member enables a desired cell circuitry to be formed. In addition, it goes without saying that the locations of the fuel electrode and the air electrode may be replaced in dependence on the kinds of gases (hydrogen and air, etc.) flowing through the gas flow passages.

The entire content of a Patent Application No. TOKUGAN 2001-134696 with a filing date of May 1, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A cell unit for a solid electrolyte fuel cell, comprising:
   an air electrode;
   a fuel electrode;
   a solid electrolyte sandwiched between the air electrode and the fuel electrode; and
   a porous metallic base body joined to at least one of the air electrode and the fuel electrode to form a sandwiched body,
   wherein the porous metallic base body allows at least one of oxidizing gas, to be supplied to the air electrode, and fuel gas, to be supplied to the fuel electrode, to flow through the porous metallic base body while allowing a cell power output to be collected through the porous metallic base body from reacting areas provided by the sandwiched body composed of the air electrode, the fuel electrode and the solid electrolyte, the porous metallic base body including a plurality of porous base body layers stacked to form a continuous laminated structure in which a first layer joined to at least one of the air electrode and the fuel electrode is set to exhibit porosity, lower than that of a second layer not joined to the at least one of the air electrode and the fuel electrode, and the first layer including a metallic sintered body to define a dimension in a thickness direction of the first layer of the porous metallic base body, so as to allow the at least one of the air electrode and the fuel electrode to be layered to the first layer of the porous metallic base body with a thinned film structure in which a thickness of the at least one of the air electrode and the fuel electrode is thinner than that of the first layer, and the first layer and the second layer are in direct contact with each other.

2. A cell unit for the solid electrolyte type fuel cell according to claim 1, wherein the porous metallic base body includes a first porous metallic base body joined to the air electrode and a second porous metallic base body joined to the fuel electrode wherein the first porous metallic base body, one of the air electrode and the fuel electrode, the solid electrolyte, the other one of the air electrode and the fuel electrode and the second porous metallic base body are stacked in a sequence.

3. A cell unit for the solid electrolyte fuel cell according to claim 1, wherein the air electrode and/or the fuel electrode have a thickness of a value ranging from 1 to 50 μm.

4. A cell unit for the solid electrolyte fuel cell according to claim 1, wherein the solid electrolyte serves as an electrolyte and has a thickness of a value equal to or less than 50 μm.

5. A cell unit for the solid electrolyte fuel cell according to claim 1, wherein the porous metallic base body has a thickness of a value ranging from 0.5 to 5 mm.

6. A cell unit for the solid electrolyte fuel cell according to claim 1, wherein the plurality of porous base body layers are the same kinds having different pore rates or different kinds.

7. A cell unit for the solid electrolyte fuel cell according to claim 6, wherein the first layer joined to at least one of the air electrode and the fuel electrode has a thickness of a value ranging from 50 to 500 μm.

8. A cell unit for the solid electrolyte fuel cell according to claim 6, wherein the first layer joined to at least one of the air electrode and the fuel electrode has a pore diameter equal to or less than 50 μm.

9. A cell unit for the solid electrolyte fuel cell according to claim 6, wherein the first layer joined to at least one of the air electrode and the fuel electrode has a pore rate of a value equal to or greater than 20%.

10. A cell unit for the solid electrolyte fuel cell according to claim 6, wherein the second layer not joined to at least one of the air electrode and the fuel electrode has a thickness of a value equal to or greater than 100 μm.

11. A cell unit for the solid electrolyte fuel cell according to claim 6, wherein the second layer not joined to at lest one of the air electrode and the fuel electrode has a pore diameter of a value ranging from 100 to 1000 μm.

12. A cell unit for the solid electrolyte fuel cell according to claim 6, wherein the second layer not joined to at lest one of the air electrode and the fuel electrode has a pore rate of a value equal to or greater than 60%.

13. A cell unit for the solid electrolyte fuel cell according to claim 1, wherein the porous metallic base body comprises an alloy containing at least one metal selected from the group consisting of nickel, nickel chrome, nickel-chrome iron, nickel-chrome-tungsten molybdenum, nickel cobalt, nickel copper, silver, silver palladium, silver platinum, iron-chrome nickel and iron-chrome aluminum.

14. A cell unit for the solid electrolyte fuel cell according to claim 1, wherein the porous metallic base body comprises ceramics plated with an alloy containing at least one metal selected from the group consisting of nickel, nickel chrome, nickel-chrome iron, nickel-chrome-tungsten molybdenum, nickel cobalt, nickel copper, silver, silver palladium, silver platinum, iron-chrome nickel and iron-chrome aluminum.

15. A cell unit for a solid electrolyte fuel cell, comprising:
    an air electrode;

a fuel electrode;
a solid electrolyte sandwiched between the air electrode and the fuel electrode; and
joining means for joining to at least one of the air electrode and the fuel electrode,
wherein the joining means allows at least one of oxidizing gas, to be supplied to the air electrode, and fuel gas, to be supplied to the fuel electrode, to flow through the joining means while allowing a cell power output to be collected through the joining means from reacting areas provided by the sandwiched body composed of the air electrode, the fuel electrode and the solid electrolyte, the joining means including a continuous laminated porous structure in which a first layer joined to at least one of the air electrode and the fuel electrode is set to exhibit porosity, lower than that of a second layer not joined to the at least one of the air electrode and the fuel electrode, and the first layer including a metallic sintered body to define a dimension in a thickness direction of the first layer, so as to allow the at least one of the air electrode and the fuel electrode to be layered to the first layer of the joining means with a thinned film structure in which a thickness of the at least one of the air electrode and the fuel electrode is thinner than that of the first layer, and the first layer and the second layer are stacked and in direct contact with each other to form the continuous laminated porous structure.

* * * * *

UNITED STATES PATENT AND TRADEMARK OFFICE
CERTIFICATE OF CORRECTION

PATENT NO.       : 7,186,475 B2                                           Page 1 of 1
APPLICATION NO.  : 10/128307
DATED            : March 6, 2007
INVENTOR(S)      : Itaru Shibata et al.

It is certified that error appears in the above-identified patent and that said Letters Patent is hereby corrected as shown below:

On the title page of the Letters Patent,

Under section "(56) References cited, OTHER PUBLICATIONS", change "Institut fur Technische Thermodynakik" to -- Institut fur Technische Thernodynamik --, Under section "(57) Abstract", line 4, change "lease" to -- least --

Signed and Sealed this

Thirteenth Day of November, 2007

JON W. DUDAS
*Director of the United States Patent and Trademark Office*